No. 609,525. Patented Aug. 23, 1898.
A. STARK.
FIBER VESSEL.
(Application filed Apr. 29, 1897.)
(No Model.)
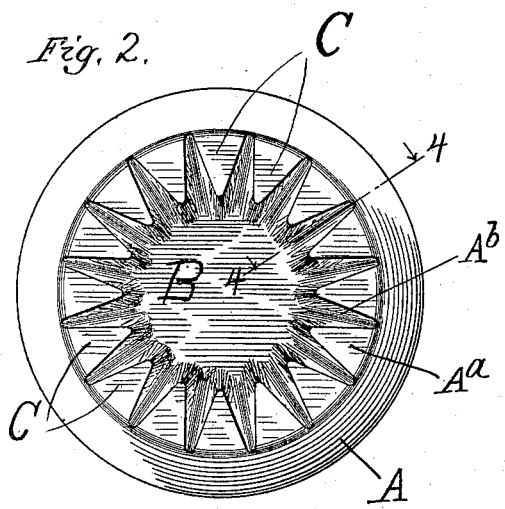
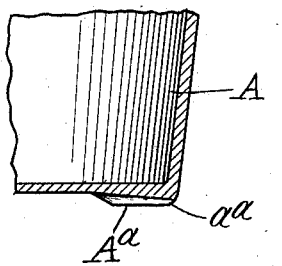
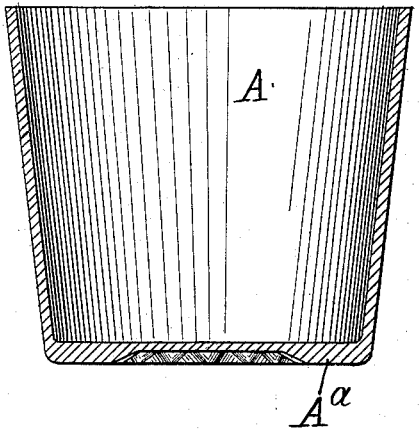
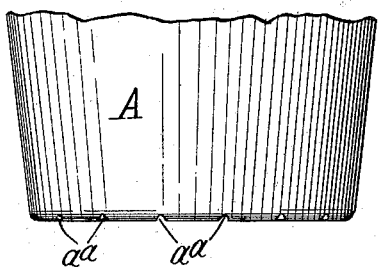
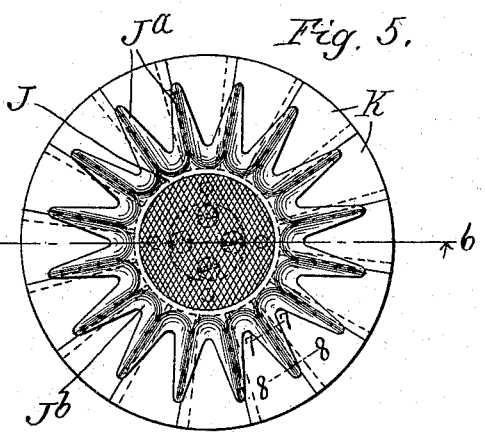
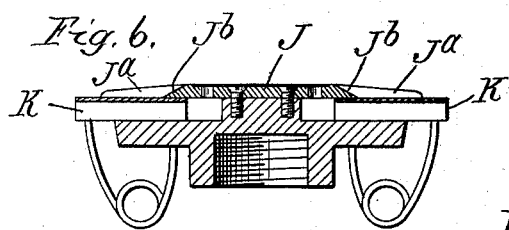
Witnesses.
E. T. Wray
Jean Elliott
Inventor.
Andrew Stark
by Burton and Burton
his attys
THE NORRIS PETERS CO., PHOTO-LITHO., WASHINGTON, D. C.

UNITED STATES PATENT OFFICE.

ANDREW STARK, OF CHICAGO, ILLINOIS.

FIBER VESSEL.

SPECIFICATION forming part of Letters Patent No. 609,525, dated August 23, 1898.

Application filed April 29, 1897. Serial No. 634,377. (No model.)

*To all whom it may concern:*

Be it known that I, ANDREW STARK, a citizen of the United States, residing at Chicago, county of Cook, and State of Illinois, have invented an Improvement in Fiber Vessels, which is fully set forth in the following specification, reference being had to the accompanying drawings, forming a part thereof.

The purpose of this invention is to provide a form of fiber vessel improved in the character of the bottom, particularly in respect to the service performed by the annular marginal uprise or projection which forms the contact of a pail or similar vessel with the surface on which it is supported.

It consists in a novel form and structure of the bottom of a vessel and requires in its production a novel form of die adapted to produce such bottom.

In the drawings, Figure 1 is an axial section of a fiber pail embodying my invention. Fig. 2 is a bottom plan of the same. Fig. 3 is a detail side elevation showing a bottom portion of the pail. Fig. 4 is a detail section at the line 4 4 on Fig. 2. Fig. 5 is a plan view of a radially reducible and extensible die for forming the bottom. Fig. 6 is a section at the line 6 6 on Fig. 5. Fig. 7 is a section at the line 7 7 on Fig. 5. Fig. 8 is a section at the line 8 8 on Fig. 5.

My improvement in respect to the vessel itself consists in making, in lieu of the annular marginal projection or chime, a circular series of V-shaped feet, practically meeting at the outer circumference of the bottom of the vessel, so that the exterior appearance of the latter is not materially altered from the customary form, said triangular feet having their apexes pointing to the center, the wedge-shaped intervals between them being tapering not merely in a horizontal plane, as seen looking directly at the bottom of the pail, but being also tapering vertically—that is, deepening from the circumference to the center—so that the bottoms of said intervals merge gradually in the central flat surface of the bottom of the vessel.

A is a pail; B, the central portion of the bottom.

C C C, &c., are the triangular feet, whose lower surfaces are flat and afford broad contact-surface for the pail with its support, sloping off toward each other from their proximate oblique edges, the interval deepening as it widens from the periphery toward the center—that is, from the outer base of the triangular feet at the periphery to the inner apexes of said feet. If the pail were finished angularly where the sides and bottom meet, no interval would appear between the feet, looking at the pail in side elevation; but as the pail is finished by slightly rounding the corner, as seen in Fig. 3, the removal of the material to produce the rounded corner opens into the wedge-shaped intervals between the triangular feet at the shallowest point of their depth, such opening showing, as at $a^a$ in Fig. 3, where the pail is viewed in side elevation. These side openings, being insufficient to disfigure the pail in any respect and, in fact, serving slightly to ornament the lower edge, constitute ventilating-apertures for the space which would otherwise be inclosed under the bottom of the pail, where it rests on a flat surface, and thereby tend to prevent the retention of moisture under the pail when it is left standing after having been in water, thus preventing much inconvenience which results from such retention of moisture by the ordinary pail. In the process of formation of a bottom of this form upon a fiber pail, where it is performed in the manner hereinafter described and by the devices herein shown, a large part of the fiber, which is forced out of the central portion and out of the wedge-shaped intervals between the triangular feet in the process of formation of the latter, is crowded into the feet themselves, rendering them more dense and when indurated considerably harder and tougher than a chime or uninterrupted annular uprise formed in the ordinary way would be. A special advantage, however, is obtained with this form of bottom in the process of waterproofing and indurating the same, because the waterproof and indurating material, having access to the triangular feet not only at the bottom surface, but also at the lateral converging edges, penetrates the feet more thoroughly, particularly at the corners formed at the converging edges and at the apex, and when the drying or baking process is performed these feet are much harder and tougher and less liable to wear or break than a similar annular chime or uprise formed of the same material and indurated in the same manner could be made. In addition to this advantage the triangular form of the feet causes the outer corner or edge, which is exposed to the blows incident to use, to be reinforced or braced, so that the foot will not crack or yield, so as to cause the outer indurated scale to crack or be broken off except under a blow hard enough to actually crack the substance, whereas in the case of a chime of common form, which is without such reinforcement or bracing, a blow hard enough to break the thin chime or even to spring it severely is liable to crack the indurated scale and expose the softer interior to the moisture, which, being absorbed, soon renders the vessel worthless.

The mechanism for forming such a pail comprises suitable interior and exterior forms having the necessary tapering shape to conform to and produce the customary interior and outer taper of the body or sides and, in connection therewith, a suitable head or bottom forming die, which is shown in Fig. 5. The detail structure of this die is such as to adapt it to be reducible radially by the sliding in of the several marginal and overlapping sections K K K as the body is reduced by compression between the tapering forms employed for that purpose, as may be fully understood by reference to United States Patent No. 561,788. The central portion or die proper, J, has radial fingers or ribs $J^a$ $J^a$, &c., whose form in section is shown in Figs. 7 and 8. These fingers $J^a$ are at their roots or bases of the full thickness of the central portion or hub of the disk J, being in cross-section at this point rounded on the operating-face, and from this full size at the base they taper to a point, being rounded in cross-section throughout the entire longitudinal taper and terminating in bluntly-rounded ends. These fingers are tapered or reduced in cross-section, both vertically and horizontally, from base to tip, and the transverse as well as the longitudinal section exhibits the tapering form, as seen in Fig. 6 and illustrated in Figs. 7 and 8. Furthermore, it will be noticed that the surface of the central hub or disk, considered on radial lines extending between the fingers—that is, to the base of the intervening notches—slopes off gradually to the notch at the point $J^b$, as shown in section, Fig. 6.

The pail, molded with a bottom of substantially uniform thickness, being suitably exposed to pressure between inner and outer tapering forms at the sides and receiving at the bottom the pressure of the bottom-forming die described, has such bottom formed by the die and eventually conforms thereto. When the intrusion of the bottom die commences, the pulp encountered by the raised center or hub of the die and the bases of the fingers or radial ribs is first displaced and passes into the angular space around the central boss and, therein, into the triangular spaces between the radial fingers or ribs $J^a$. As compression proceeds and the water is partly forced out of the pulp the latter becomes "stubborn," tending to hang together and not yield to displacement, and the shape of the fingers $J^a$ is contrived with a special reference to adapting them to effect such displacement notwithstanding the characteristic of the pulp. The fiber displaced by the intrusion of the base of the finger is, by the shape of that base, which is rounded, but tapering in cross-section, as described, and which is also tapering in radial section, partly forced radially outward and partly forced circumferentially away from the radial line of the crest of the finger, and the material encountered between the fingers of the die at their base is also forced radially outward by the slope of the margin of the notch between the fingers, as seen in Fig. 6, so that the feet, which are formed upon the bottom of the pail, occupying the intervals between the fingers $J^a$ of the disk, are compacted by having forced into them a large proportion of the fibrous matter that is thus forced horizontally out of the circular central portion of the bottom and out of the interval between the feet by the intrusion of the finger $J^a$, the fiber being, however, also compacted vertically under the central hub or boss and under said fingers in the hollows or grooves between the triangular feet thus formed. The total diameter of the disk J to the tips of the fingers $J^a$ is approximately equal to the diameter to which the reducible head is designed to be reduced in the process of compressing the cap radially—that is, to compress its sides so that when the reduction is complete—that is, when the pail is completely compressed—the points of the fingers $J^a$ very nearly coincide with the conical outer surface of the pail. In finishing up the pail the sharp or accurate angle formed between the sloping sides and the general plane of the bottom is rounded off, as seen in Figs. 1, 3, and 4, and this process cuts into the radial depressions formed by the finger $J^a$, so that the cavity in the bottom of the pail formed by the disk J and its fingers opens out through the margin of the pail, as seen at $a^a$ in Fig. 3, and incidentally there is afforded by this means ventilation for the space under the pail when it stands on a level surface. The indurating process to which the pail is then subjected has already been indicated—to wit, that it is immersed in or coated with suitable liquid, which is absorbed into the fiber, and the pail is then baked, whereby a proper hardening is effected to the depth to which the indurating material has been absorbed, and, as above noted, the angles of the triangular feet, exposing two surfaces to the liquid, absorb the same more thoroughly and are consequently more thoroughly hardened in the baking process.

I have shown my device adapted to a pail-making machine wherein the molded form receives its final compression by being forced into the frustum of a cone; but I do not intend thereby to limit myself in the practice of the invention to the use of such mechanism nor to giving the bottom the form described by pressure applied only at the final stage; nor is my invention limited in respect to the character of the vessel, provided only it is one which can receive a bottom of the character described.

I claim—

1. A fiber vessel having the bottom impressed to form triangular feet about the periphery with a depressed center, and radial depressions between the feet merging in such depressed center.

2. A fiber vessel whose bottom exterior has a depressed center, and radial depressions merging in said central depression, said radial depressions having their bottoms inclined or sloping from the bottom of the central depression to the outer lower periphery of the vessel, and constituting openings through said periphery.

3. A fiber vessel having the bottom formed with a central depression and radial extensions therefrom diminishing in depth outward from the central depression, said radial extensions being deepest at their central radial lines respectively, whereby there are formed between them, on the bottom of the vessel, triangular feet in an annular series, said feet having sloping sides and points.

4. A fiber vessel whose bottom has exteriorly a depressed center and radial depressions merging in said central depression, leaving a marginal series of triangular feet projecting from such bottom, such triangular feet having their lateral edge portions of greater density than the remainder of the bottom.

In testimony whereof I have hereunto set my hand, in the presence of two witnesses, at Chicago, Illinois, this 26th day of April, 1897.

ANDREW STARK.

Witnesses:
E. T. WRAY,
JEAN ELLIOTT.